United States Patent [19]
Moertl et al.

[11] Patent Number: 5,829,018
[45] Date of Patent: Oct. 27, 1998

[54] APPARATUS AND METHOD FOR WRITING DATA FROM A CACHE TO A STORAGE DEVICE

[75] Inventors: Daniel F. Moertl, Rochester; Mark D. Christianson, Hastings; Lee D. Cleveland, West Concord; David E. Becker; Gene S. Van Grinsven, both of Rochester, all of Minn.

[73] Assignee: International Business Machines Corporation, Armonk, N.Y.

[21] Appl. No.: 863,101

[22] Filed: May 23, 1997

Related U.S. Application Data

[63] Continuation of Ser. No. 328,486, Oct. 25, 1994, abandoned.

[51] Int. Cl.[6] .................................................. G06F 12/08
[52] U.S. Cl. ............................................. 711/113; 711/133
[58] Field of Search ........................... 711/111, 112, 113, 711/114, 133, 134, 135, 136, 159, 160

[56] References Cited

U.S. PATENT DOCUMENTS

| | | | |
|---|---|---|---|
| 4,423,479 | 12/1983 | Hanson et al. ............................ | 711/113 |
| 4,506,323 | 3/1985 | Pusic et al. ............................... | 711/161 |
| 4,593,354 | 6/1986 | Ushiro ................................. | 395/185.01 |
| 4,792,898 | 12/1988 | McCarthy et al. ....................... | 711/118 |
| 4,800,483 | 1/1989 | Yamamoto et al. ...................... | 395/306 |
| 4,805,098 | 2/1989 | Mills, Jr. et al. ......................... | 711/118 |
| 4,916,605 | 4/1990 | Beardsley et al. ....................... | 711/162 |
| 5,142,627 | 8/1992 | Elliot et al. .............................. | 395/825 |
| 5,161,219 | 11/1992 | Nicholson et al. ...................... | 711/119 |
| 5,163,131 | 11/1992 | Row et al. .......................... | 395/200.32 |
| 5,202,972 | 4/1993 | Gusefski et al. ......................... | 711/123 |
| 5,247,648 | 9/1993 | Watkins et al. .......................... | 711/143 |
| 5,257,352 | 10/1993 | Yamamoto et al. ..................... | 711/136 |
| 5,263,142 | 11/1993 | Watkins et al. .......................... | 395/842 |
| 5,276,840 | 1/1994 | Yu .......................................... | 395/855 |
| 5,283,890 | 2/1994 | Petolino, Jr. et al. ................... | 711/122 |

OTHER PUBLICATIONS

IBM Technical Disclosure Bulletin, "Write Cache Management Structure", vol. 36 No. 10 Oct. 1993, pp. 125–129.

Howarth, "A Review of Disk Scheduling Policies", The Australian Computer Journal, vol. 14 No. 4 Nov. 1982, pp. 150–154.

*Primary Examiner*—Eddie P. Chan
*Assistant Examiner*—Kevin L. Ellis
*Attorney, Agent, or Firm*—Merchant & Gould

[57] ABSTRACT

A write cache operation builder for use in building a write operation for writing data from a cache to a disk drive in a computer system is disclosed. The write cache operation builder is built from a CMS of a DASD. It converts the CMS entries of the CMS into a FIFO entry and scans the FIFO entry in order to calculate a write operation comprising the largest number of sectors of data. The write cache operation builder may be implemented via hardware or software.

20 Claims, 8 Drawing Sheets

APPARATUS AND METHOD FOR WRITING DATA FROM A CACHE TO A STORAGE DEVICE

This application is a continuation of Ser. No. 08/328,486 filed Oct. 25, 1994 now abandoned.

FIELD OF THE INVENTION

The present invention relates generally to computer data storage devices. More particularly, it relates to an apparatus and method for writing data from a cache to a storage device in a computer system.

BACKGROUND OF THE INVENTION

A typical computer system includes a central processing unit (CPU), at least one storage device, such as a direct access storage device (DASD), and a cache. When a system wants to write data to the DASD, it generally first writes the data to the cache. When the cache becomes full, however, it becomes necessary to write some of the data from the cache to the DASD so that the cache can accept more data.

Various techniques have emerged to write data from a cache to a DASD. One known technique involves a least recently used selection criteria for determining which data in the cache is to be written to the DASD. This technique first searches for the least recently used data in the cache. It then looks up each adjacent sector, and stops building once a sector gap is found. This technique, therefore, cannot reliably and consistently build the largest possible write operation.

Another problem with this and most other existing techniques is that they require the building of numerous write operations in order to write data to discontiguous sectors on the DASD. In most existing techniques, discontiguous sectors on the DASD cannot be written in one operation. In other words, there cannot be "holes" in the write operation. Only contiguous sectors on the DASD can be written to. By increasing the number of write operations necessary to drain the cache, the speed and overall performance of the computer system is decreased.

Yet another disadvantage with existing techniques is that they require management and control of all of the cache sectors simultaneously. As a result, complex and sophisticated logic is necessary to build the write operation. This logic may also increase processing time, thereby degrading the computer system's overall performance.

Accordingly, there is a need for a fast and efficient apparatus and method for writing data from a cache to a storage device of a computer system.

SUMMARY OF THE INVENTION

The present invention overcomes the problems of the prior art with an apparatus and method which builds a write operation that writes data from a cache to a storage device such that the cache is drained quickly and efficiently.

One aspect of the invention relates to a computer system that builds such a write operation. The computer system includes a processor; at least one data storage device coupled to the processor, the storage device defining a plurality of sectors; and a cache coupled to the storage device and the processor, the cache having a plurality of cache management stack entries and comprising write means for building a write operation, the write means comprising: a first logic which converts at least a portion of the cache management stack entries of the cache into an entry; and a second logic which scans the entry in order to calculate a write operation having a maximum number of sectors of data.

Another aspect of the invention relates to a write cache operation builder for use in such a computer system.

Yet another aspect of the invention relates to a method of building such a write operation. The method includes the steps of scanning the cache management stack entries of the cache; calculating as the cache management stack entries are scanned, a number of cache management stack entries sectors within a selectable range; and determining the range having the largest number of cache management stack entries.

A further aspect of the invention relates to yet another method of building such an operation. The method includes the steps of reading at least one of the cache management stack entries of the cache; generating an entry identifying a number of previously read cache management entries falling within a range, if the logical block address of the currently read cache management entry and the logical block address of the previously read cache management entry are not within the range; and scanning the generated entry in order to determine whether the number of cache management entries identified in the generated entry is greater than a number of cache management entries identified in a previously generated entry, so that the generated entry corresponding to the largest number of cache management entries is determined.

DETAILED DESCRIPTION OF THE PREFERRED EMBODIMENTS

The computer system of the present invention improves the speed and efficiency of writing data from cache to a direct access storage device (DASD). The present invention improves the speed and efficiency by building a write operation which permits writing from the cache to discontiguous sectors of the DASD in one write operation, and which contains the largest possible number of sectors of data. The write operation is built from a Cache Management Stack (CMS) stored in a table in the cache. The write cache operation builder of the present invention converts the entries of the CMS into a first in first out (FIFO) entry and scans the FIFO entry in a manner such that a write operation comprising the largest number of sectors of data is determined.

Figure 1:
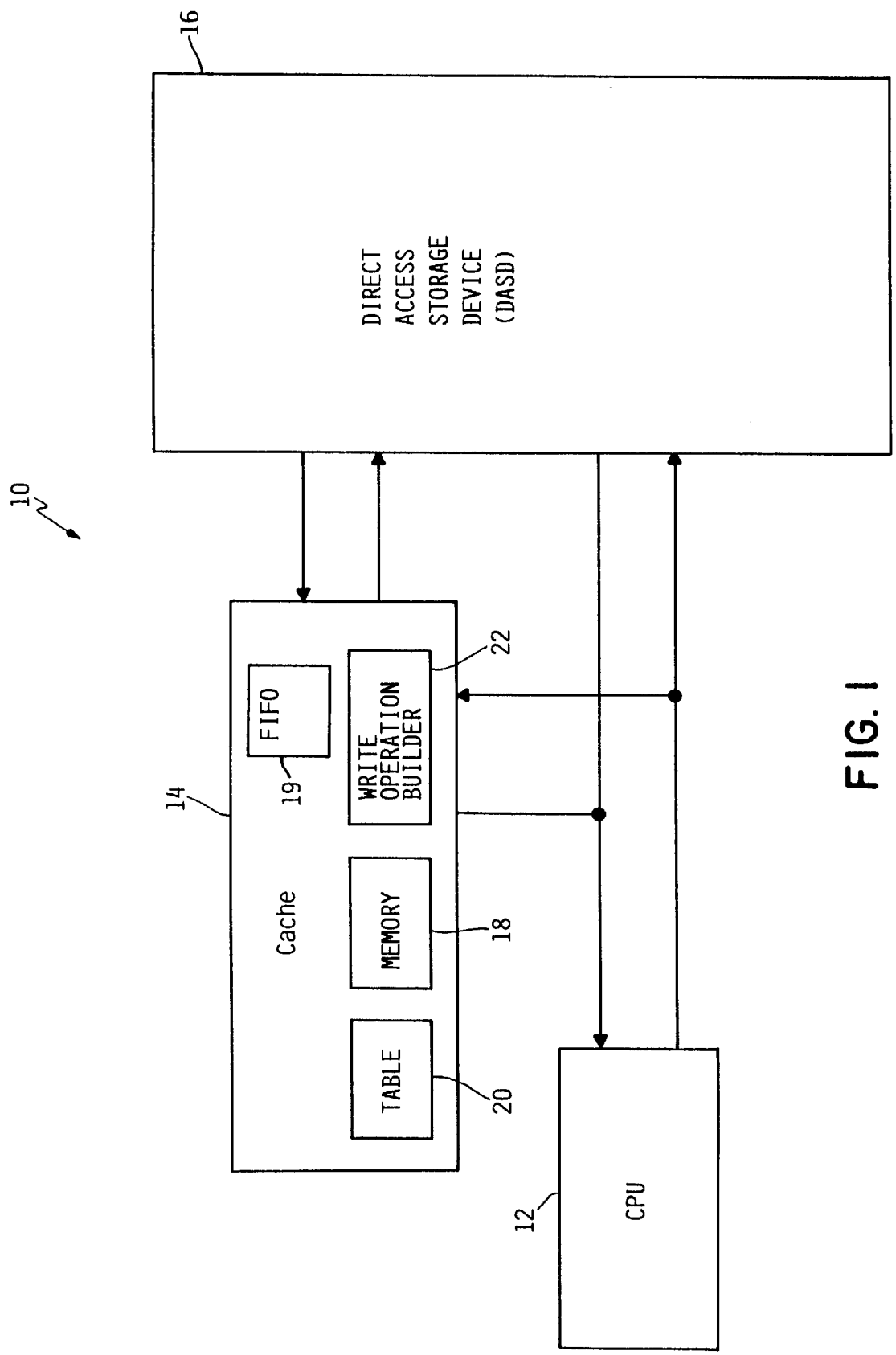
FIG. 1 is a diagram of a computer system using a write cache operation builder in accordance with the present invention.

Referring to FIG. 1, computer system 10 includes a CPU 12, a cache 14, and a DASD 16. While only one DASD is shown in computer system 10, it can be understood that the present invention may also be used in computer systems having a plurality of such devices. CPU 12 is coupled to both cache 14 and DASD 16. CPU 12 and DASD 16 are conventional types as is known in the art. For example, such DASDs may include hard disks.

DASD 16 defines a plurality of sectors into which data may be stored. Typically, the size of each sector is 512 bytes. Each sector is identified by a logical block address (LBA) corresponding to the logical address of that sector on the DASD. Cache 14 comprises a table 20 which includes a CMS. The CMS comprises a plurality of CMS entries. Each CMS entry corresponds to a sector stored in cache 14 which contains data for DASD 16. The CMS entries are sorted by the LBAs of their corresponding DASD sectors, in increasing order. Each CMS entry corresponds to a sector data descriptor (SDD) which represents the data's actual location in the 14 cache.

Figure 2:
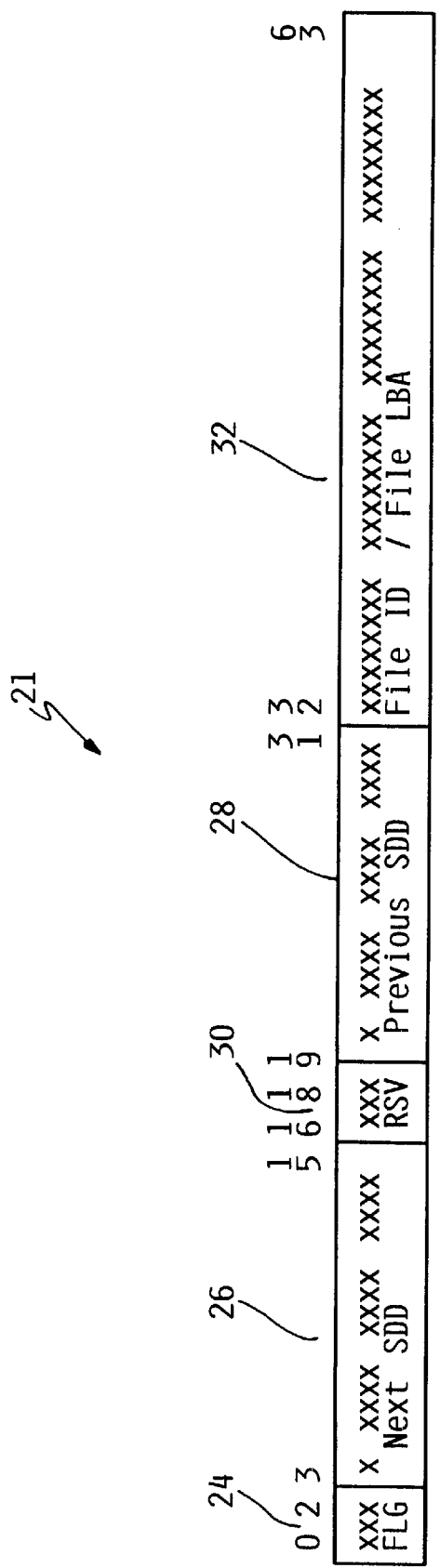
FIG. 2 is a diagram of a prior art CMS entry for a CMS of the DASD sectors stored in the cache of FIG. 1.

Table 20's CMS for DASD 16 uses a double linked list structure to control the data in cache 14. An example of a CMS entry 21 implementing this structure is shown in prior art FIG. 2. In particular, CMS entry 21 includes a control flag 24, a pair of pointers 28 and 26 for pointing to the previous and the next SDDs, respectively, a reserve flag 30, and a file identifier/LBA 32. Control flag 24 provides information regarding the status of CMS entry 21, such as whether or not a write is in progress, and the state of a mark bit. Preferably, CMS entry 21 is 8 bytes long, with a control flag 24 which is 3 bits long, pointers 26 and 28 each of which is 13 bits long, a reserve flag 30 which is 3 bits long, and a file identifier/LBA 32 which is 32 bits long. The CMS entries of the CMS may be built and modified by either hardware or microcode.

Referring back to FIG. 1, cache 14 includes the table 20, a memory 18, a FIFO 19, and a write operation builder 22. Memory 18 is preferably Random Access Memory (RAM) which is divided into a plurality of sectors in which data may be stored. In a preferred form, memory 18 comprises a plurality of 512 byte sectors, the size of each sector matching the size of the DASD's sectors.

Write operation builder 22 represents an algorithm used to build a write operation from the CMS in table 20 for DASD 16. Write operation builder 22 may be implemented in either hardware or software, and is preferably implemented in an integrated circuit chip. In general, write operation builder 22 searches the entire CMS of table 20 once in a manner that permits the determination of the largest possible write operation for cache 14.

Figure 3:
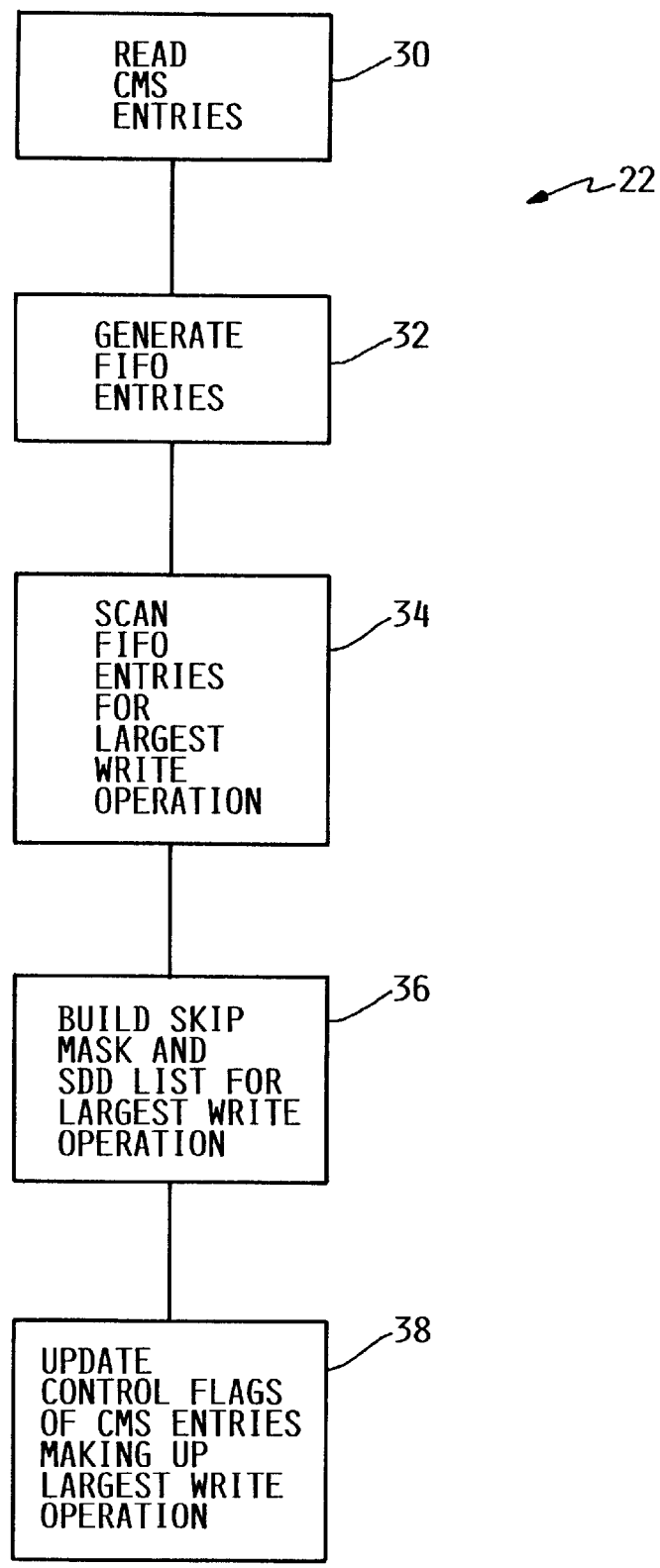
FIG. 3 is a logic flow diagram of a preferred logic for use in the write cache operation builder of FIG. 1.

FIG. 3 shows a preferred logic for write operation builder 22. The preferred logic as shown is made up of five main steps. In the first step 30, all of the CMS entries on table 20's CMS are read as fast as the hardware allows. The syntax of each of the CMS entries is preferably verified as each CMS entry is read. The order of the LBA field of each of the CMS entries read is also preferably verified to ensure that the CMS entries are still in incrementing LBA order.

In the second step 32, first in first out (FIFO) entries are generated. Each FIFO entry combines up to a predetermined number of CMS entries that fall within the same predefined range. In one embodiment, step 32 converts up to eight CMS entries which fall within the same 4 kilobyte range into a single FIFO entry. The size of the range, however, is variable, and preferably is of a size which corresponds to the page size of the computer system in order to prevent pages from being half in the cache 14 and half on the DASD 16. With such a configuration, up to 256 sectors may be represented in the FIFO entry as thirty two entries, thereby reducing the amount of information that must be processed by one eighth. As a result, less logic is required to implement the present invention.

Figure 4:
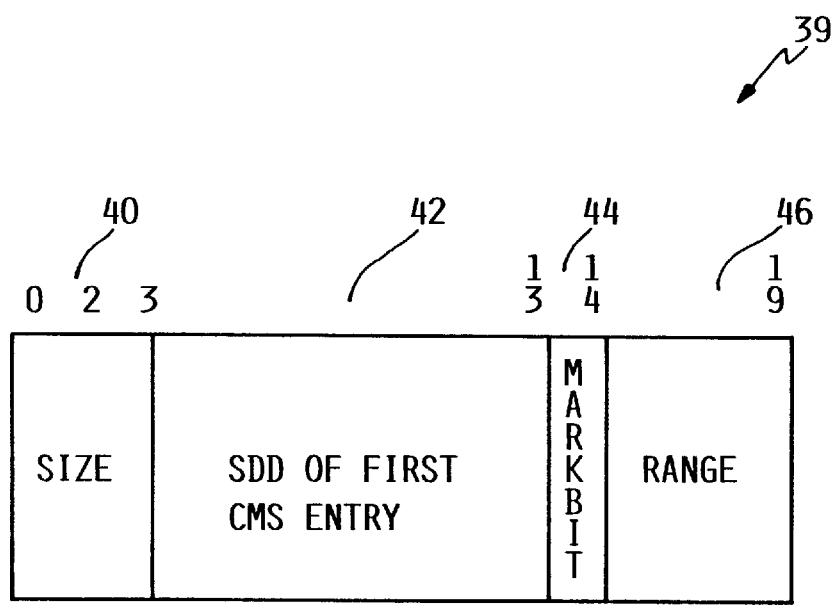
FIG. 4 is a diagram of a preferred FIFO entry generated by the logic of FIG. 3.

A preferred FIFO entry 39 is shown in FIG. 4. As is shown, FIFO entry 39 is a 22 bit entry and includes four fields. The first field 40 is a size field identifying the number of CMS entries converted during step 32. The second field 42 is a SDD field identifying the SDD address of the first CMS entry used. The third field 44 is a mark bit field identifying whether any of the CMS entries converted during step 32 had a mark bit set. Old data was check pointed by marking each sector, where old data refers to data having previously been marked by a mark bit. This field helps ensure that the write operation built by write operation builder 22 contains at least one sector having its mark bit set. This helps to reduce the amount of small groups of data that will stay in cache 14 and thus, further ensures that old data gets written out.

The last field 46 of FIFO entry 21 is a range field identifying the range of the FIFO entry. The range is determined by the difference between bits 32–60 of the current FIFO entry's LBA and that of the previous FIFO entry's LBA. Step 32 of a preferred write operation builder supports a range of 1 to 32 FIFO entries. The range, however, is variable. In a preferred form, size field 40 is 3 bits long, SDD field 42 is 13 bits long, mark bit field 44 is 1 bit long, and range field 46 is 5 bits long.

In the third step 34, the fields of each FIFO entry generated in step 32 are scanned so that the largest write operation is determined. The maximum number of sectors that may be built is selectable, preferably within a range between 1 and 256 sectors. This permits the size of the write operation to be limited when the temporary buffer space is limited. Two write operations, however, may be found which have an equal number of sectors. As a result, a preferred write operation builder 22 builds a write operation with the smallest range between discontiguous sectors referred to as the skip range since a write operation with a smaller skip range will execute faster.

After DASD 16's entire CMS has been scanned, the first SDD of the largest write operation and its length are determined. The first SDD of the largest write operation found and its length are then used in step 36 to build a skip mask and SDD list for the write operation. Each bit in the skip mask specifies whether the corresponding sector is to be written or skipped. If the bit is equal to a binary one, the sector should be written. If the bit is equal to a binary zero, the sector should be skipped. It can be understood, however, that the logic state assigned to the bits is not critical and could be interchanged. For optimal performance, the first bit of the skip mask is preferably a binary one and the length of the skip mask should contain no trailing bytes of all zeros.

In step 38, the control flag 24 of each of the CMS entries making up the largest write operation is updated to indicate that a write is in progress. Preferably, steps 30, 32 and 34 are performed in parallel, followed by step 36 and then step 38. With such a write operation builder, drainage of cache 14 is fast and efficient.

Figure 5A:
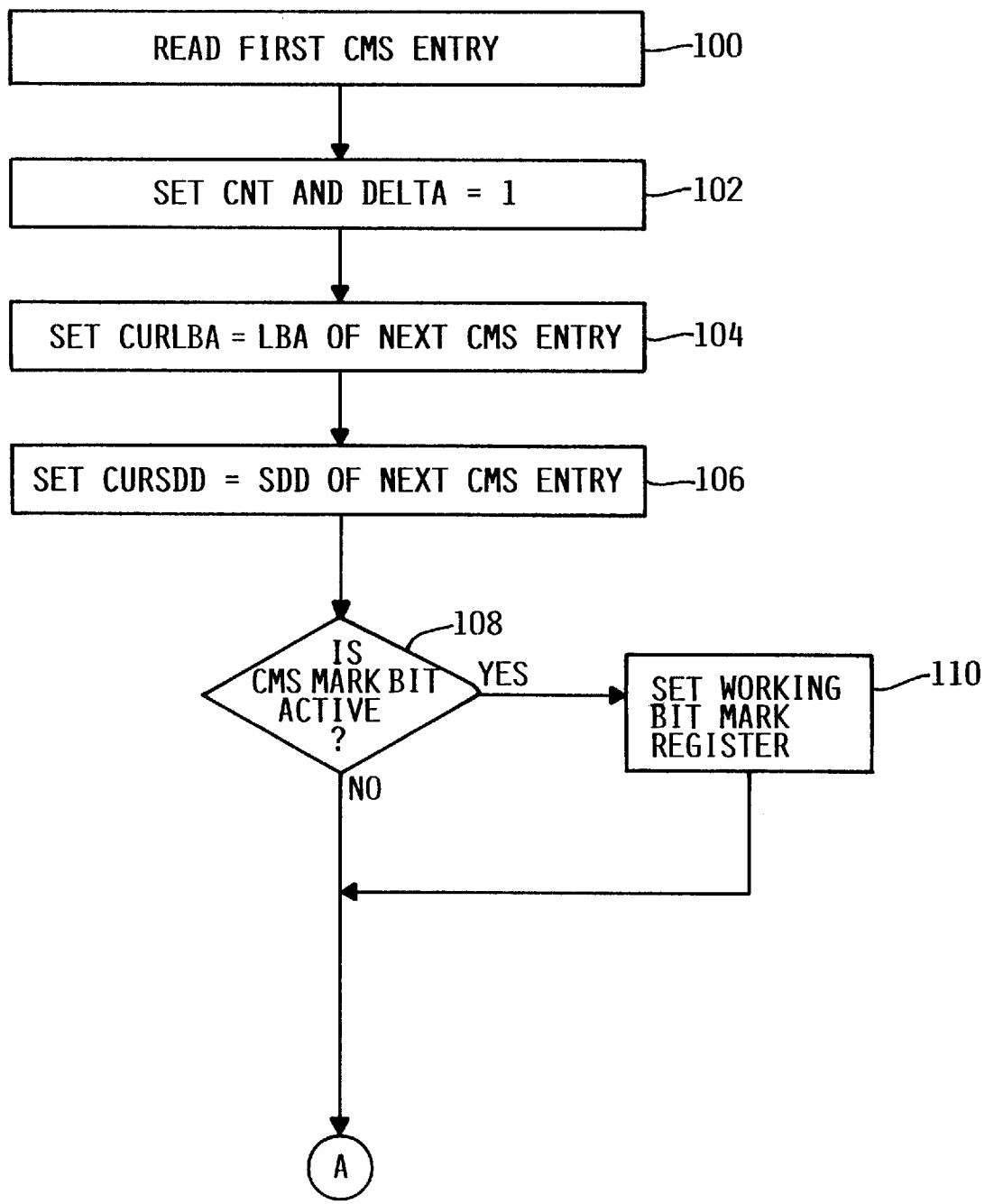
FIG. 5 is a logic flow diagram of a preferred logic for use in the FIFO entry generation step of FIG. 3.
Figure 5B:
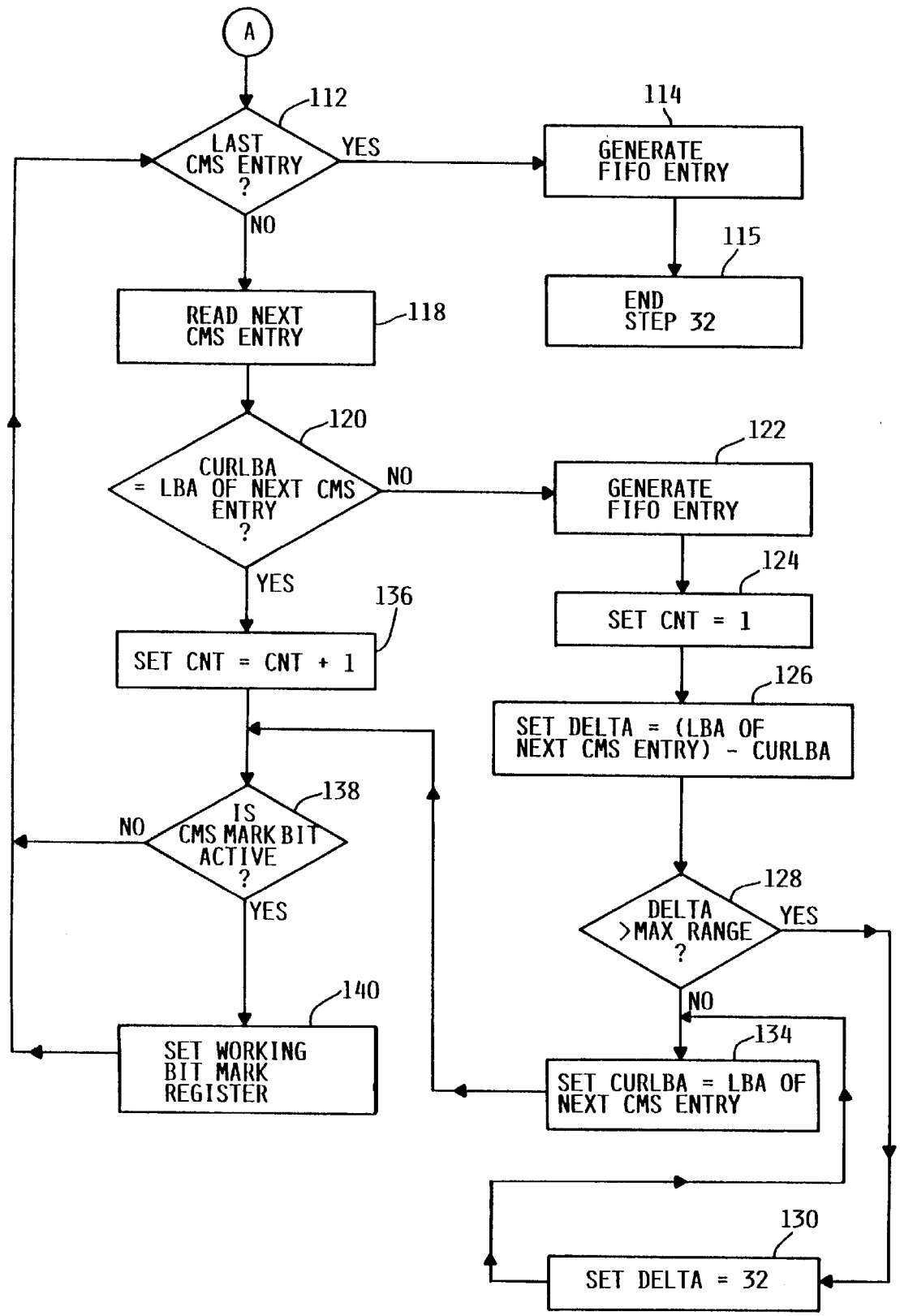

Preferred logic for steps 32 and 34 will now be discussed in further detail with reference to FIGS. 5 and 6. In order to generate a FIFO entry, a counter CNT, a plurality of working registers DELTA, CURSDD, CURLBA, and a working bit MARK may be used. Counter CNT keeps track of the number of CMS entries read so that size field 40 of the FIFO entry may be determined. Working register DELTA keeps track of the range between 4 kilobyte aligned LBAs so that range field 46 of the FIFO entry may be determined. Working registers CURSDD and CURLBA keep track of the SDD and LBA, respectively, of each of the CMS entries read during step 30. Working bit MARK register keeps track of the status of the mark bit of each CMS entry read during step 30. The working bit MARK register is reset after a FIFO entry is generated. As is shown in FIG. 5, at 100 the first CMS entry of DASD 16's CMS is read. At 102, counter CNT and working register DELTA are set to one. At 104, working register CURLBA is set to the LBA of the next CMS entry of DASD 16's CMS. At 106, working register CURSDD is set to the SDD of the next CMS entry of DASD 16's CMS. At 108, a check is made to determine whether the mark bit of the currently read CMS entry is active. If so, at 110, working bit MARK is set. If not, at 112, a check is made to determine whether the currently read CMS entry is the last CMS entry on DASD 16's CMS. If so, at 114 a FIFO entry is generated, and at 115, step 32 is ended.

If the currently read CMS entry is not the last CMS entry, at 118 the next CMS entry is read. At 120, a check is made to determine whether the contents of working register CURLBA is equal to the LBA of the CMS entry read at 118. If not, at 122 a FIFO entry is generated. Then, at 124, counter CNT is set to one and at 126, the contents of working register DELTA is set to the difference between the LBA of the CMS entry read at 118 and the contents of working register CURLBA. At 128, a check is made to determine whether the contents of working register DELTA is greater than the maximum range (i.e., thirty two). If so, at 130 working register DELTA is set to the maximum range, and at 134, the contents of working register CURLBA is set to the LBA of the CMS entry read at 118. Control is then moved to 138.

If at 120 the contents of working register CURLBA is equal to the LBA of the CMS entry read at 118, at 136 the contents of counter CNT is incremented by one. At 138, a check is made to determine whether the mark bit of the CMS entry read at 118 is active. If so, at 140, working bit MARK is set, and control is returned to 112. If not, control is returned to 112. Accordingly, a FIFO entry will be generated each time the LBA of the next CMS entry read is not within the same 4 kilobyte aligned range the LBA of the currently read CMS entry.

Each time a FIFO entry is generated by step 32, step 34 is automatically begun. Like step 32, step 34 also uses a plurality of working registers, which may include working registers MARKCNT, RANGE, SIZE, MAXRANGE and MAXSIZE. Working register MARKCNT keeps track of the number of mark bits in the range of FIFO entries currently being looked at in step 34. As previously mentioned, write operation builder 22 can be configured such that only a write operation including at least one sector that has its mark bit set to a predetermined logic state will be written. Working register RANGE keeps track of the range of an operation. The range of an operation is identified by the sum of the range fields of the FIFO entries between two pointers, FPTR and BPTR. Pointer FPTR points to the front of the first FIFO entry in the range of the operation, while pointer BPTR points to the back of the FIFO entry currently being used by step 34. Working register SIZE keeps track of the number of sectors within the range of an operation. Working registers MAXRANGE and MAXSIZE keep track of the largest range and size, respectively.

Figure 6A:
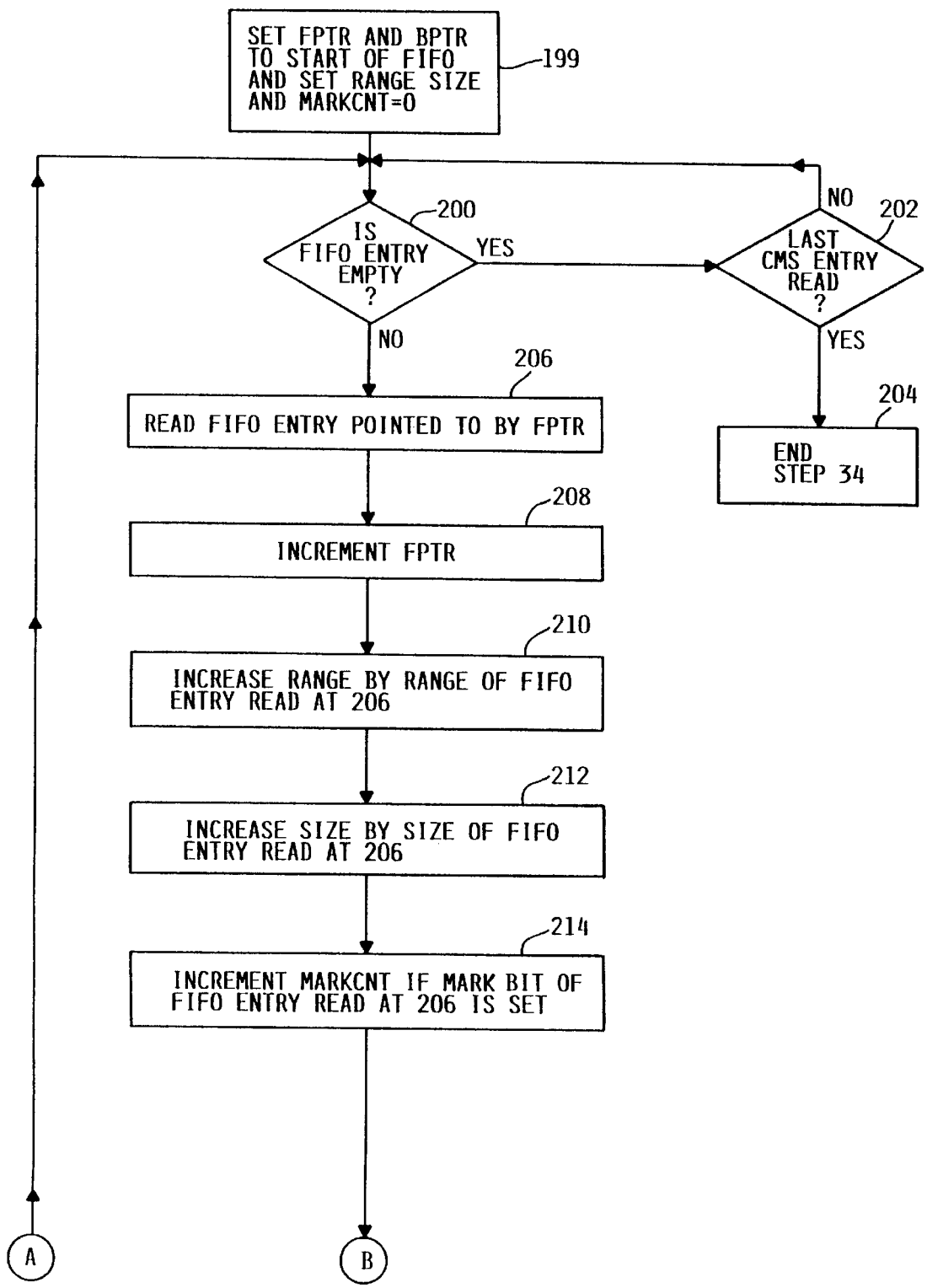
FIG. 6 is a logic flow diagram of a preferred logic for use in the FIFO entry scanning step of FIG. 3.
Figure 6B:
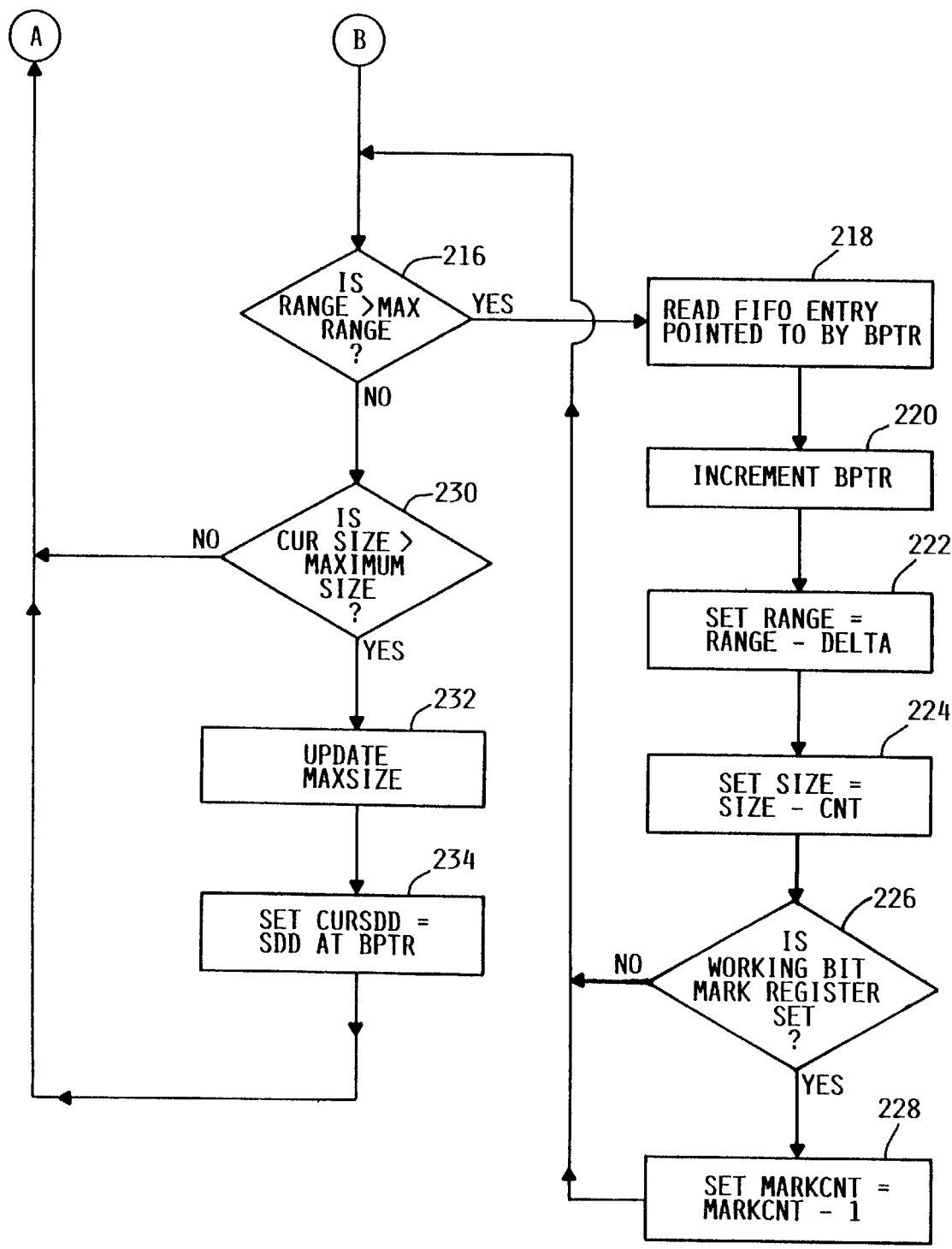

With reference to FIG. 6, at 199, pointer FPTR and BPTR are set equal to the start of the FIFO first generated by step 32, and working registers RANGE, SIZE and MARKCNT are initialized (i.e., set to 0). At 200, a check is made to determine whether the FIFO entry is empty. If so, at 202 a check is made to determine whether the last CMS entry of DASD 16's CMS has been read. If the last CMS entry has been read, at 204, step 34 is ended. If not, control is returned to 200.

If the FIFO entry is not empty, at 206 the FIFO entry is read, and at 208, pointer FPTR is incremented. At 210, working register RANGE is increased by the range of the previous FIFO entry read at 206. At 212, working register SIZE is increased by the size of the previous FIFO entry read at 206. At 214, working register MARKCNT is incremented if the mark bit 44 of the FIFO entry read at 206 is set.

At 216, a check is made to determine whether the contents of working register RANGE is greater than the contents of working register MAXRANGE. If so, the entry at pointer BPTR is removed, and its mark, size and range fields are subtracted from the corresponding working registers. In particular, at 218, the next FIFO entry is read, at 220 pointer BPTR is incremented, at 222 the contents of working register RANGE is reduced by the range 46 of the FIFO entry read at 218, and at 224 the contents of working register SIZE is reduced by the size 40 of the FIFO entry read at 218. At 226, a check is made to determine whether mark bit 44 of the FIFO 35 entry read at 218 is set. If so, at 228 the contents of working register MARKCNT is reduced by one. Control is then returned to 216.

If mark bit 44 read at 218 is not set, control is moved to 216 where the range check is repeated. If the working register RANGE is not greater than the contents of working register MAXRANGE, then at 218, the contents of the FIFO entry are removed so that another FIFO entry may be generated.

At 230, a check is made to determine whether the contents of working register SIZE is greater than the contents of MAXSIZE. If so, at 232 the contents of working register MAXSIZE is updated to the contents of working register SIZE. At 234, the contents of working register CURSDD is set to the SDD corresponding to the FIFO entry pointed to by pointer BPTR. If the contents of working register SIZE is not greater than the contents of working register MAXSIZE, control is returned to 200.

The write operation built with the present system and method permits data to be written to discontiguous sectors of the storage device in one operation. It also permits the determination of the largest possible write operation for a cache so that the number of write operations necessary to drain the cache is minimized. As a result, the present system and method for building a write operation is both fast and efficient.

The foregoing constitutes a description of various features of a preferred embodiment. Numerous changes to the preferred embodiment are possible without departing from the spirit and scope of the invention. Hence, the scope of the invention should be determined with reference not to the preferred embodiments, but to the following claims.

What is claimed is:

1. A computer system, comprising:

a processor;

at least one data storage device coupled to the processor, the storage device defining a plurality of sectors;

a cache coupled to the storage device, the processor, and an entry register, the cache storing a plurality of cache management stack entries; and write means for building a write operation, the write means comprising:

converting means for converting at least some of the cache management stack entries stored in the cache to an entry, and for storing the entry in the entry register; and scanning means for scanning, concurrently while the converting means converts the at least some of the cache management stack entries, the entry in order to determine a write operation having a maximum number of sectors of data;

wherein the write operations having the maximum number of sectors of data is executed by the processor to write the sectors of data to the storage device.

2. The computer system of claim 1, wherein the write operation executed by the processor effects writing of the sectors of data to discontiguous sectors of the storage device.

3. The computer system of claim 1, wherein the write means comprises means for determining a skip range, the skip range defining a separation between two discontiguous sectors in the storage device, so that the write operation having the smallest skip range is executed by the processor.

4. The computer system of claim 1, wherein the write means is embodied in an integrated circuit.

5. The computer system of claim 1, further comprising verification means for verifying, concurrently while the converting means converts the at least some of the cache management stack entries, that the logical block addresses of the cache management stack are stored in an incrementing order in the cache.

6. The computer system of claim 1, wherein each of the cache management stack entries has an associated logical block address corresponding to one of the sectors defined by the storage device, and wherein the converting means comprises comparison means for comparing each of the logical block addresses of the cache management stack entries with an address range, such that only the cache management stack entries having logical block addresses falling within the address range are converted to the entry.

7. The computer system of claim 6, wherein the scanning means comprises means for counting a number of cache management entries within the range.

8. The computer system of claim 5, wherein the address range is selectable.

9. A write cache operation builder for use in building a write operation to write sectors of data from a cache, storing a plurality of cache management stack entries, to a data storage device defining a plurality of sectors, the cache and the data storage device being coupled to a processor and a first-in-first-out (FIFO) register, the write cache operation builder comprising:

a first logic being arranged and configured for converting some of the cache management stack entries stored in the cache to an entry in the FIFO register; and a second logic being arranged and configured to operate in parallel with execution of the first logic, for removing the entry from the FIFO register and scans the entry in order to determine a write operation having a maximum number of sectors of data.

10. The write cache operation builder of claim 9, wherein the write operation determined by the second logic comprises logical block addresses corresponding to discontiguous sectors on the storage device.

11. The write cache operation builder of claim 9, wherein each of the cache management stack entries includes a mark bit, the mark bit indicating whether data associated with a cache management stack entry has been stored in the cache for a greater duration of time relative to other cache management stack entries stored in the cache, and wherein the second logic selects the write operation having the maximum number of data sectors when the mark bit of at least one cache management stack entry converted by the first logic is set to a predetermined logic value.

12. A method of building a write cache operation for writing data from a cache having a plurality of cache management stack entries to a data storage device defining a plurality of sectors, comprising:

scanning the cache management stack entries of the cache;

calculating, concurrently as the cache management stack entries are scanned, a number of cache management stack entries having logical block addresses that fall within a selectable range of logical block addresses; and determining, concurrently with the scanning and calculating steps, a range of data storage device sectors associated with a largest number of cache management stack entries.

13. A method of building a write cache operation for writing data from a cache having a plurality of cache management stack entries to a storage device defining a plurality of sectors, each of the cache management stack entries having a logical block address associated with one of the sectors of the storage device, comprising;

reading the cache management stack entries of the cache;

generating in a register an entry indicating a number of previously read cache management entries having logical block addresses falling within a range of logical block addresses of a logical block address of a currently read cache management entry and a logical block address of a previously read cache management entry do not fall within the range of logical block addresses; and scanning the entry generated in the register to determine whether the number of cache management entries indicated in the generated entry is greater than a number of cache management entries indicated in a previously generated entry in the register, so that a generated entry corresponding to a largest number of cache management entries is determined.

14. The method of claim 13, wherein the generating step comprises the step of comparing the logical block address of the currently read cache management stack entry with the logical block address of the previously read cache management stack entry to determine whether the currently read cache management stack entry and the previously read cache management entry are within the range of logical block addresses.

15. The method of claim 13, wherein the generating step further comprises the step of counting the number of cache management entries within the range of logical block addresses.

16. The method of claim 13, wherein the reading step comprises the step of verifying that an order of the logical block addresses of the cache management entries is incrementing.

17. The method of claim 13, wherein the step of reading generating, and scanning are preformed in parallel.

18. The method of claim 13, further comprising the step of selecting the range of logical address blocks.

19. The method of claim 13, wherein the scanning step comprises the step of calculating a size of the sectors and a logical block address range for the generated entry.

20. The method of claim 19, wherein the scanning step further comprises the steps of:

storing the calculated size and range in a second register; and updating the second register when the calculated size and range of the generated entry are greater than the calculated size and range of the previously generated entry.

* * * * *

UNITED STATES PATENT AND TRADEMARK OFFICE
CERTIFICATE OF CORRECTION

PATENT NO.   : 5,829,018
DATED        : October 27, 1998
INVENTOR(S)  : Daniel F. Moertl et al.

It is certified that error appears in the above-identified patent and that said Letters Patent is hereby corrected as shown below:

Column 7,
Line 20, "." should be -- , --.
Line 21, "stack are" should be -- stack entries are --.

Column 8,
Line 24, "of" (first occurrence) should be -- if --.

Signed and Sealed this

First Day of March, 2005

JON W. DUDAS
*Director of the United States Patent and Trademark Office*